United States Patent [19]

Moses et al.

[11] Patent Number: 5,075,880

[45] Date of Patent: Dec. 24, 1991

[54] METHOD AND APPARATUS FOR TIME DOMAIN INTERPOLATION OF DIGITAL AUDIO SIGNALS

[75] Inventors: Robert W. Moses, Kirkland, Wash.; Donald W. Moses, Minneapolis, Minn.; James M. Kresse, Marlton, N.J.

[73] Assignee: Wadia Digital Corporation, Minneapolis, Minn.

[21] Appl. No.: 597,512

[22] Filed: Oct. 12, 1990

Related U.S. Application Data

[63] Continuation of Ser. No. 268,830, Nov. 8, 1988, abandoned.

[51] Int. Cl.$^5$ .......................... G06F 15/31; G06F 7/38
[52] U.S. Cl. .................................. 364/724.10; 364/723
[58] Field of Search ..................... 364/724.01, 724.10, 364/723; 84/1.01, 1.28; 381/29–40, 51; 375/27, 81; 342/192

[56] References Cited

U.S. PATENT DOCUMENTS

| | | | |
|---|---|---|---|
| 4,076,958 | 2/1978 | Fulghum | 381/51 |
| 4,270,026 | 5/1981 | Shenoi et al. | 364/724.10 |
| 4,303,803 | 12/1981 | Yatsuzuka | 381/31 |
| 4,652,857 | 3/1987 | Meiksin | 381/31 |
| 4,815,132 | 3/1989 | Minami | 381/31 |

OTHER PUBLICATIONS

Ronald W. Schafer, Lawrence R. Rabiner, *A Digital Signal Processing Approach to Interpolation*, Proc. IEEE, vol. 61, No. 6, 1973, pp. 692–702.
Ronald E. Crochiere, Lawrence R. Rabiner, *Interpolation and Decimation of Digital Signals—A Tutorial Review*, Proc. IEEE, vol. 69, No. 3, pp. 300–331.
John Vanderkooy, Stanley P. Lipshitz, *Resolution Below the Least Significant Bit in Digital Systems with Dither*, J. Audio Eng. Soc., vol. 32, No. 3, Mar. 1984, pp. 106–112.
Tor A. Ramstad, *Digital Methods for Conversion Between Arbitrary Sampling Frequencies*, IEEE Transactions on Acoustics, Speech and Signal Processing, vol. ASSP-32, No. 3, Jun. 1984, pp. 577–591.
Stanley P. Lipshitz, John Vanderkooy, *Digital Dither*, Audio Engineering Society Preprint, presented at the 81st Audio Engineering Society Convention, Nov. 12–16, 1986.

*Primary Examiner*—Gary V. Harkcom
*Assistant Examiner*—Long T. Nguyen
*Attorney, Agent, or Firm*—Dorsey & Whitney

[57] ABSTRACT

An apparatus for the domain interpolation of digital audio signals includes a signal processor apparatus to reconstruct the digital audio signal. The signal processor apparatus includes a receiver for receiving a digital audio signal, a decoder for demodulating the signal, a central processing unit for performing a time domain interpolation on the decoded signal to produce an interpolated data signal having an increased sampling rate over the digital audio signal, and a digital-to-analog converter for converting the interpolated data signal into an analog output signal that may be transmitted to an amplifier for output through a speaker. The signal processor apparatus achieves an oversampling rate and digital to analog conversion that will allow a digital audio system to more precisely reconstruct an analog audio signal from a digital audio signal such that there will be no perceptible difference between the reconstructed digital signal and the original analog signal.

27 Claims, 8 Drawing Sheets

METHOD AND APPARATUS FOR TIME DOMAIN INTERPOLATION OF DIGITAL AUDIO SIGNALS

This is a continuation of application Ser. No. 07/268,830 filed Nov. 8, 1988, now abandoned

TECHNICAL FIELD

The present invention relates generally to the field of digital audio systems. More particularly, the present invention relates to a method and system for time domain interpolation of digital audio signals that will allow a digital audio system to more precisely reconstruct an analog audio signal from a digital audio signal such that there will be no perceptible difference between the reconstructed signal and the original signal.

BACKGROUND ART

Digital audio systems are well known in the prior art. Presently, two types of digital audio systems, the compact disc (CD) and the digital audio tape (DAT), are enjoying commercial success as mass production audio reproduction systems. While the benefits of digital recordings over conventional analog recordings are also well-known, digital audio systems have failed to attract critical listeners of professional or high-end audio systems. Such listeners are accustomed to enjoying immaculately precise and realistic music reproduction currently possible with professional or high-end analog systems. Because of deficient stereophonic imaging of current digital audio systems, digital audio technology has been almost universally rejected by the professional and high-end audio markets.

The goal of any digital audio system is to sample and reconstruct an analog audio signal without noticeable changes to the signal so as to recreate authentic sounding music. If, for example, the audio signal is sampled at a recording studio and the digital samples are stored on a CD, then the CD player must retrieve the digital samples and reconstruct the waveform of the audio signal as close as possible to the waveform of the original analog signal.

In theory, any analog signal can be reconstructed if an infinite number of digital samples are taken of the analog signal. In practice, the sampling rate of a digital audio system is governed by the Nyquist Theorem that any signal may be sampled and reconstructed provided the sampling rate is at least twice the highest frequency component of the original analog signal. An insufficiently high sampling rate tends to create an overlap in the reconstructed signal that gives rise to a special form of distortion known as aliasing. When the sampling rate is too low, the frequency domain images of the reconstructed signal overlap with the baseband and corrupt the higher frequency components of the baseband. Avoidance of aliasing is a primary goal of the sampling process of a digital audio system.

Because human hearing is usually considered to be bandlimited to 20 KHz, some prior art systems have proposed that a 20 KHz bandwidth is sufficient for high quality audio reproduction systems. The 20 KHz figure is based partly on tests where a subject is instructed to listen to a sinusoidal waveform that continuously increases in frequency and determine when the signal becomes inaudible. Most people will not be able to detect such a signal once it reaches 20 KHz. The audio bandwidth of current CD systems is 20 KHz and the guard band is 2 KHz. Therefore, the digital sampling rate, in accordance with the Nyquist Thereom, is 44.1 KHz. The audio bandwidth of current DAT systems is 20 KHz, and the guard band is 4 KHz, yielding a digital sampling rate of 48 KHz.

Although the human ear is incapable of detecting steady frequencies above 20 KHz, this does not mean that audio signals can be routinely bandlimited to this amount and still achieve high quality audio reproduction. In fact, studies have indicated that the human ear can perceive sonic effects of transient components of audio signals up to frequencies as high as 100 KHz. When an audio signal comprised of many transient pieces of high frequency sinusoids is passed through a digital audio system limited to a 20 KHz bandwidth, the transients will be spread out and will lose their transient nature, thereby degrading the quality of the audio reproduction.

Transients are necessary for professional and high-end audio reproduction because they are important to human hearing in the reconstruction of wavefronts that yield the three-dimensional ambience associated with stereophonic signals. To most listeners of professional or high-end audio systems, it is critical that the reproduced music possess this three-dimensional ambience where each individual sound source is perceived as being located on an imaginary sound stage. Indeed, the illusion of a stable three-dimensional sound image is the fundamental feature on which stereo sound is predicated.

Transients are also important in the resolution of the individual nuances of each of the sound sources. Natural music consists of characteristic noises and momentary silences between notes or overtone oscillations. It is important to prevent sonic blurring of these subtle nuances in the program material. Such details are easily destroyed by audio systems with poor transient response or excessive thermal noise and distortion, with the reproduced music sounding muddy and devoid of fine detail.

The presence of many transient pieces of high frequency sinusoids in audio signals requires a higher sampling rate for exact reproduction of those transient signals. For example, a 20 KHz sinusoid signal will be reproduced exactly by an audio system having a 20 KHz bandwidth only if the signal is turned on at a time of minus infinity and is never turned off. Once a signal is turned on and then turned off after a given number of cycles (i.e., a transient signal is created), a higher bandwidth is required in order to exactly reproduce that signal. In general, the required bandwidth to pass a finite number of cycles of a sinusoidal signal ($F_S$) is: $BW = F_S*(1 + 1/\# \text{ of cycles})$. For example, the required bandwidth to pass one cycle of a 15 KHz sinusoidal signal would be 30 KHz, a frequency much higher than the 20 KHz bandwidth limit of current digital audio system. Unfortunately, it is not practical to digitally sample audio signals to preserve frequencies up to 100 KHz because to do so would greatly increase the amount of digital information to be stored.

The problem of an insufficient sampling rate to reproduce high frequency transients in current digital audio systems is further compounded by the use of frequency domain brickwall filters to smooth the digital samples during the reconstructing of the analog audio signal. Early digital audio systems utilized an analog brickwall low pass filter in the digital-to-analog conversion to extract the baseband frequencies and reject the sampled harmonics above the bandwidth of the system. The analog brickwall filter fills in and smooths the signal between the points in the step function output created by averaging the samples together. In essence, the brickwall filter rounds off the edges of the signal output to create a smooth analog signal output.

Theoretically, a frequency domain method of digital audio signal reconstruction should work if the low pass brickwall filter could ideally pass all signals below its threshold or roll-off frequency at unitary gain and reject all signals above its roll-off frequency, and if the distance between the digital sample points is small enough that information is not lost during the sampling process. Unfortunately, an ideal low pass filter can not be realized. While it is possible to create a low pass brickwall filter that has excellent frequency domain specifications when driven by constant-energy-envelope sinusoids, when this brickwall or taut filter is driven by the transients and impulses of dynamic music material it generates overshoot, ripple and ringing. Because the sampling rates for CD and DAT systems are close to the minimum allowed Nyquist rate (40 KHz), most of the quantization noise generated by the sampling process will be concentrated in the base band audio range. In addition, image frequencies that extend from close to the base band to the top of frequency region are the frequencies that are most susceptible to audio amplifier nonlinearities (100 KHz -2 MHz), The process in current digital audio systems is therefore non-optimal as designed in the frequency domain, both because of the inadequate sampling rate and because of the imperfect brickwall filter.

In an attempt to solve these problems, a method known as "oversampling" is used by some prior art digital audio system to increase the sampling rate to a rate typically four times the original sample rate (e.g., 176 KHz for CD's). The basic idea of the prior art oversampling techniques is to implement a digital low pass filter to carry out the function of the analog brickwall smoothing filters, with samples retrieved from the digital low pass filter at the higher oversampling rate. This is possible by adding zero magnitude (trivial) samples between each of the original samples to effectively increase the sampling rate of the system, although the trivial samples add no new information to the signal. For a more detailed explanation and critique of the prior art oversampling techniques, reference is made to Moses, R., "Improved Signal Processing for Compact Disc Audio System", *Proceedings; Montech '87 IEEE Conference on Communications*, Nov. 9-11, 1987, pp. 203-211, which is fully incorporated by reference herein.

The problem with current frequency domain oversampling techniques is that the digital filter, sometimes referred to as a Finite Impulse Response (FIR) filter must meet the same stringent ideal demands as the analog brickwall filter it replaces. Any deviation from an ideal low pass filter will cause corresponding alteration of the output signal. The design of the digital filters for current oversampling techniques is accomplished by normalizing the frequency parameters to the sampling rate. For example, if the sample rate is 44 KHz and the filter roll-off frequency is 20 KHz, the design frequency parameter will be 20/44 KHz=0.4545. In the case of an oversampling FIR filter, the final sampling rate must be used as the design parameter. If a four times oversampling FIR filter is desired, the design parameter will be 20/176 KHz=0.1136. The digital audio system must also include a transition band that spans the bandwidth of the transition region between 20 KHz-22 KHz, or a 2 KHz bandwidth. If a sixteen times oversampling FIR filter is desired for the transition band, the design parameter will be 2/704 KHz=0.0028. Such normalized frequency parameters are too small for the calculations required to derive the associated filter because the numbers do not contain enough significant digits. Without a sufficient number of significant digits in the calculation, these parameters introduce deviation from the desired response. As a result, the frequency domain design method for the digital FIR oversampling filters is unable to accommodate high oversampling rates.

Another limitation of current frequency domain oversampling techniques lies in the alteration of the filter coefficients. It is desirable to maintain a constant gain through the filter as the input signals are passed through it. By adding zero magnitude samples between the original samples, the amount of samples weighted by the filter at any instant of time are reduced in proportion to the number of trivial samples added. Because not all of the coefficients of the original samples are now used in the calculation of the output, the gain will vary as samples are shifted through the filter. This causes a corresponding deviation in the magnitude of the output signal that the listener may hear as a small degree of noise.

A further problem in the design of the FIR digital filters in the frequency domain is the arbitrary nature of choosing the appropriate frequency domain parameters. For example, with a given FIR filter order (typically 100 taps), parameters for each of the pass band, transition band, and stop band characteristics must be weighed in the specification of the filter. Without knowing reliable, acceptable figures for these parameters, the designer is effectively guessing at appropriate values for the filter.

Primarily because of the problems outlined above, current frequency domain oversampling technique are not capable of producing sufficiently high oversampling rates. Consequently, the image frequencies represented by the high frequency transients still fall in the nonlinear range of most amplifiers, and, as a result, these systems do not sufficiently overcome the discussed problems.

Although the present designs for processes of current digital audio systems are adequate for reproducing musical sound, it would be advantageous to have a method and system for interpolating digital audio signals that can reconstruct the high frequency and transient characteristics of the signals and enable the reproduction of high-quality musical sound in a professional or high-end digital audio system such that there will be no perceptible difference between the reconstructed signal and the original signal.

SUMMARY OF THE INVENTION

In accordance with the present invention, a signal processor means is provided to reconstruct a digital audio signal. The signal processor means includes a receiver means for receiving a digital audio signal, a decoder means for demodulating the signal, a central processing means for performing a time domain interpolation on the decoded signal to produce an interpolated data signal having an increase sampling rate over the digital audio signal, and a conversion means for converting the interpolated data signal into an analog output signal that may be transmitted to an amplifier for output through a speaker.

In the preferred embodiment of the present invention, the central processing means is comprised of two parallel digital signal processors, one for each channel, each signal processor being comprised of a pair of interleaved digital signal processors, each performing the calculations for either the even or odd coefficients of a Lagrangian time domain interpolation. The outputs of the digital signal processors are synchronized and converted to an analog output signal by a series of cascaded instantaneous current-to-voltage digital-to-analog converters. The result is an oversampling rate of sixty-four times (64 X) the original sampling rate of the digitized audio signal allowing the digital signal processing means to reconstruct the high frequency and transient characteristics of the digitized signals and enabling the reproduction of high-quality musical sound in a professional and high-end digital audio system.

Accordingly, a primary objective of the present invention is to provide a method and system for time domain interpolation of digital audio signals that will allow a digital audio system to more precisely reconstruct an analog audio signal from a digital audio signal such that there will be no perceptible difference between the reconstructed signal and the original signal.

Another objective of the present invention is to provide a method and system for time domain interpolation and reconstruction of digital audio signals that has a higher sampling rate and will more accurately reproduce the high frequency transients present in the original audio signal.

A further objective of the present invention is to provide a method and system for time domain interpolation of digital audio signals that will allow for a more precise determination and implementation of the digital signal processing parameters.

An additional objective of the present invention is to achieve an oversampling rate that will shift the image frequencies of the reconstructed digital audio signal out of the non-linear range of the audio system, and suppress the quantization noise as much as possible in the baseband region.

A further objective of the present invention is to provide a processing means that is capable of performing the necessary calculations for achieving the desired oversampling rate.

Another objective of the present invention is to provide a digital-to-analog conversion means that performs a 4 X linear interpolation during the conversion that also spreads the quantization noise over 4 times the area, thus reducing the amount of noise in the baseband by a factor of 4.

These and other objectives of the present invention will become apparent with reference to the drawings, the description of the preferred embodiment and the appended claims.

DESCRIPTION OF THE PREFERRED EMBODIMENT

The Signal Processing Means

Figure 1:
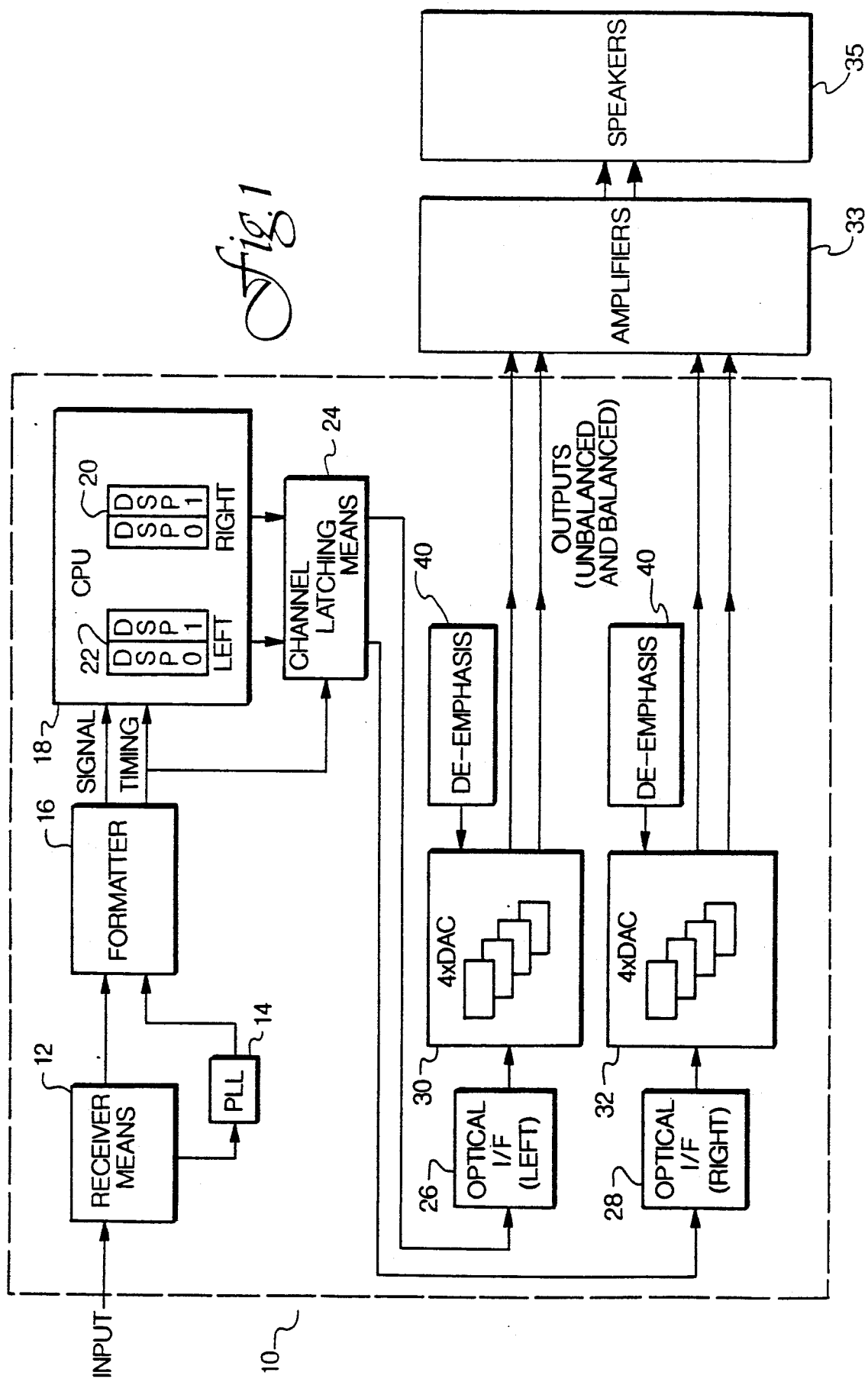
FIG. 1 is an overall block diagram showing the relationships among the components of a signal processing means in accordance with the present invention.

Referring now to FIG. 1, the components of the preferred embodiment of a digital audio system having a signal processor means 10 in accordance with the present invention will be described. The signal processor means 10 receives Input Data from a digital audio signal source. The Input Data represents digitized samples of the musical material transmitted in a predetermined format. The Input Data enters a receiver means 12 that synchronizes the Input Data with an internal clock signal via a conventional phase-lock loop means (PLL) 14. A decoder means 16 performs the data demodulation and format decoding of the Input Data to extract the Signal and Timing Data portions of the Input Data. The Signal and Timing Data are then processed by a central processing means (CPU) 18 that utilizes two digital signal processor means (DSPs) 20 and 22 to perform the time domain interpolation. The Interpolated Data generated by the central processing means 18 is then converted into an analog Output Signal by means of a pair of digital-to-analog conversion means 30 and 32.

In the preferred embodiment, digital signal processor means 20 performs the time domain interpolation for the left channel signal and is comprised of a pair of DSPs, DSP0 and DSP1—Left; digital signal processor means 22 performs the time domain interpolation for the right channel signal and is also comprised of a pair of DSPs, DSP0 and DSP1—Right. The Interpolated Data from the digital signal processing means 20 and 22 and the Timing Data from the format means 16 are fed into channel latching means 24 that generates Synchronizing Data to perfectly align the Interpolated Data for both channels. The left and right channel Interpolated Data, Timing Data and Synchronizing Data are then sent to a pair of interface means, left interface means 26 and right interface means 28, prior to converting the Interpolated Data to a pair of analog Output Signals. The interface means 26 and 28 serve to isolate the digital from the analog portions of the signal processor means 10. Connected to each interface means 26 and 28 is the digital-to-analog conversion means 30 and 32, respectively, for converting the digitized Interpolated Data to the analog Output Signal for each channel. The analog output of the digital-to-analog conversion means 30 and 32 provide both balanced and/or unbalanced Output Signals to be transmitted to an amplifier (not shown) for output through a pair of speakers (also not shown).

In the preferred embodiment, the Input Data is provided to the signal processor means 10 by a remotely located professional fiber optic transmitter (not shown) that utilizes graded index, 62.5 micron, glass optical fiber cable and metal/ceramic precision lens professional quality ST (trademark) connectors available from AT&T, Allentown, Pa. The receiver means 12 also uses professional quality ST (trademark) connectors, thereby creating a high-performance link for receiving the Input Data that is designed to accommodate data rates up to 50 Mbits/second and distances up to 3 km.

Figure 2:
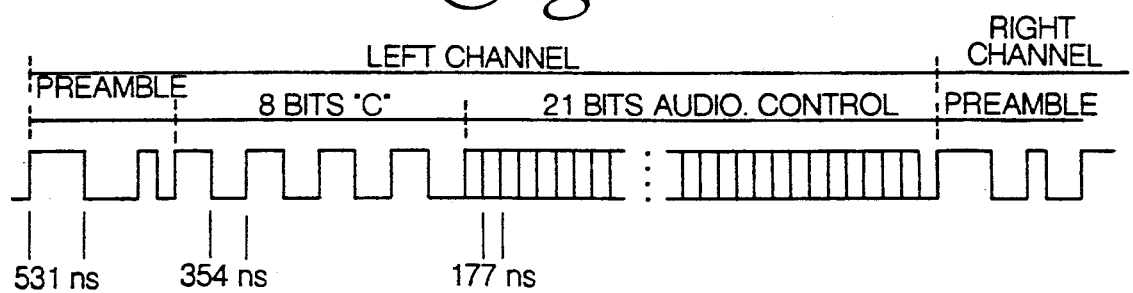
FIG. 2 is a graphic representation of a segment of digitized music material represented in the standard AES/EBU digital audio data format.

The formatter means 16 demodulates and decodes the Input Data to separate the Input Data into Signal and Timing Data depending upon a preselected format. In the preferred embodiment, the signal processor means 10 may be selectably programmed to receive CD Input Data (44.1 KHz), R-DAT Input Data (48 KHz), or Satellite Input Data (32 KHz). The sample format for Input Data received in the standard AES/EBU digital audio format shown in FIG. 2 demonstrates the relationship between the Signal Data and the Timing Data as each are represented in the particular format for the Input Data. The formatter means 16 also provides the basic clock and framing signals to the rest of the components of the signal processing means 10. In the preferred embodiment, the formatter means 16 is a Sony CX23053 Decoder Chip available from Sony Communications Products Company, Compton, California that incorporates the necessary digital logic to perform the standard decoding and demodulation operations for AES/EBU digital audio format. For a more detailed explanation of the AES/EBU digital audio format, reference is made to *AES Recommended Practice for Digital Audio Engineering—Serial Transmission Format for Linearly Represented Digital Audio Data*, ANSI Standard 4.40-1985 which is fully incorporated herein by reference.

The CPU 18 is comprised of two parallel digital signal processor means 20 and 22, each digital signal processor means consisting of a pair of digital signal processor integrated circuits, oscillators, EPROMS, and supporting buffers and latches. DSP0 and DSP1—Left and DSP0 and DSP1—Right are comprised of four WE DSP16 chips, also available from AT&T, the operation of which is more fully described in the *Data Sheet for the WE DSP16*. October, 1986, which is fully incorporated by reference herein. In addition, a synchronization circuit comprised of a counter and timer monitors the IBF output of the WE DSP16's and detects any loss of synchronization between the left and right channels if the IBF output stops pulsing. If a loss of synchronization is detected, the synchronization circuit resets the digital signal processor 10 and the data is temporarily lost.

The channel latching means 24 is a series of hardware latches timed to sum the time-multiplexed output of the DSPs. When data is output by each DSP, it is latched into one of these latches. The outputs of the latches are connected in parallel, and each latch is synchronized to output its data alternating with the others. In the preferred embodiment, the latches are comprised of 74HC564 chips available from Motorola, Inc., Phoenix, Ariz.

The interface means 26 and 28 are comprised of an optical interface in the preferred embodiment using ultra-high speed, 40 Mbaud optical couplers Model HP2400 available from Hewlett-Packard, Colorado Springs, Colo. The optical couplers provide an isolation of 1000 Volt/microsecond minimum common-mode transient immunity between the digital and analog portions of the signal processing means 10.

In the preferred embodiment, the digital-to-analog conversion means 30 and 32 are configured as transversal, summed-multiport analog delay line DACs. The DACs are four conventional 16-bit DACs, for example a ZDA1600 available from Analog Solutions of San Jose, Calif. or a PCM56P available from Burr-Brown of Tuscon, Ariz. The DACs are connected in the delay line to sum their outputs together. The first DAC is delayed by ¼th the frame time of the frame of interpolated data just calculated by the CPU 18. The second DAC is delayed ½ the frame time, the third DAC is delayed ¾th the frame time and the fourth DAC is delayed one full frame time. The result is an analog linear interpolation filer providing four times the oversampling above what is generated by the digital signal processor means 20 and 22. In addition, the resolution of the Interpolated Data is increased from 16 bits to 18 bits.

In an alternative embodiment, the signal processing means 10 also includes a deemphasis means 40 that is a selectable circuit that may be switched into the conversion means 30 and 32 to provide a passive circuit followed by a unity-gain buffer amplifier module of premium sonic quality. The deemphasis means 40 performs 50/15 ms deemphasis on the audio signal if corresponding preemphasis was used in the recording and enabled by subcode information in the digital input data stream.

The signal processing means is also provided with a power supply (not shown) that is housed in a separate enclosure from the circuitry of the signal processing means 10 in order to isolate the magnetic fields and heat associated with the power supply from the signal processing means 10. In the preferred embodiment, the power supply features independent transformers, rectifiers, and triple-stage regulation for each analog channel. In addition, three isolated power supplies are dedicated to the digital circuit portions of the signal processing means 10. To optimize the wideband trace impedances, the signal processing means 10 is implemented on an eleven layer circuit board with six layers of circuitry, ground planes and power planes, and five layers of glass-epoxy of varying thicknesses.

While the signal processing means 10 is shown in the preferred embodiment as separate from the means for retrieving the Input Data from a recording media and the means for amplifying and converting the analog Output Signals into sound waves, it is also possible to incorporate the signal processing means 10 within a digital audio system that included these components. Similarly, there are components of the signal processing means 10 that could be accomplished by other portions of a digital audio system For example, the buffer means (not shown) could be incorporated into a preamplifier module or the CPU 18, or the pair of DAC's 30 and 32 could be separated into separate physical components. It is also possible to incorporate the signal processing means 10 of the present invention into a digital audio system for use in the transmission of live music material, for example, a satellite broadcast of a concert. It should be understood that the scope of the present invention includes any combination of the various components that comprise the signal processing means 10, regardless of the type of digital audio system that the signal processing means is used in.

Theoretical Concepts Behind Sample Rate Increase

Figure 3A:
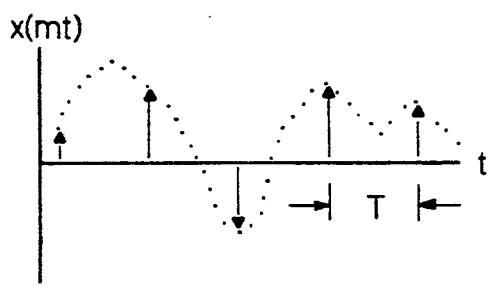
FIGS. 3a and 3b are a time and frequency domain representation of a sampled audio signal.
Figure 3B:
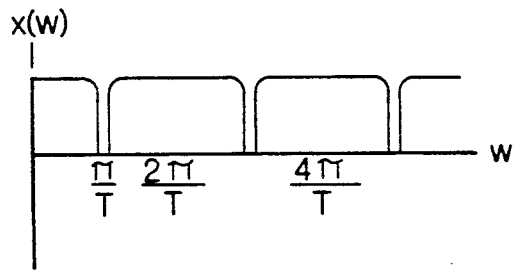

Referring now to the sampled signal shown in FIGS. 3a and 3b, both the time domain and frequency domain representations of a sampled audio signal are shown. T represents the sampling rate. As can be seen by reference to the frequency domain characteristic shown in FIG. 3b, the sampled signal has been quantized at the lowest allowable rate specified by the Nyquist theorem.

Figure 4A:
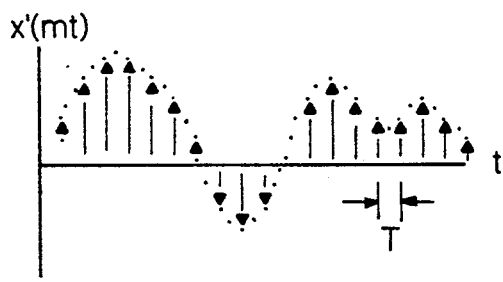
FIGS. 4a and 4b are a time and frequency domain representation of the sampled audio signal of FIGS. 3a and 3b showing the desired spectrum of the sampled signal.
Figure 4B:
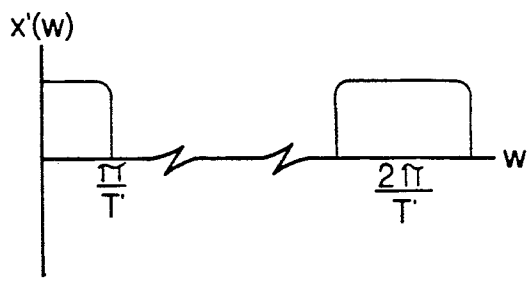

Clearly, it would be advantageous to move the higher harmonics of the sampled signal to a more distant point in the frequency domain as shown in FIG. 4b. This would correspond to the original analog signal sampled at a higher rate T'. A system and method to add L-1 samples between each of the original samples, as shown in FIG. 4a, would effectively increase the sampling rate by a factor of L.

Figure 5:
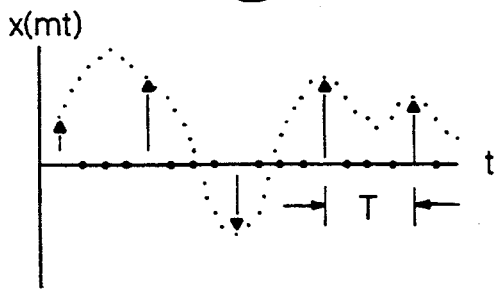
FIG. 5 is a time domain representation of the sampled audio signal of FIG. 3a showing the original sampled signal with zero magnitude (trivial) samples added.

The time domain signal of FIG. 5 is identical to that of FIG. 3a with the addition of L-1 samples of zero magnitude between each of the original samples. The sampling rate has therefore been increased by a factor of L, but no new information has been added to the sampled signal. Thus, the frequency domain characteristic is expected to resemble that of the original signal.

It is now desired to move the zero magnitude samples to their respective positions in the original analog waveform, thus achieving the interpolation of L-1 new samples between each pair of original samples. A current frequency domain method to accomplish this is diagramed in FIG. 6. Performance of the system of FIG. 6 can be analyzed as follows. Assume that the original sampling period is equal to T and the interpolated sampling period is T'. If the sampling rate increase is a factor of L then, $$T' = T/L \qquad (1)$$

Figure 6:
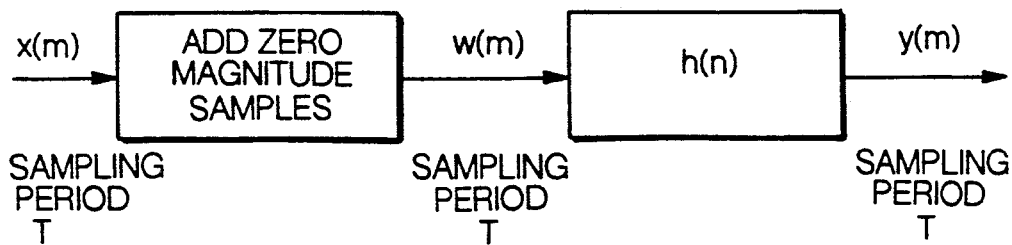
FIG. 6 is a block diagram of an oversampling system.

The first block in FIG. 6 carries out the operation of inserting L-1 samples of zero magnitude between each of the original pairs of samples. The resultant signal, w(m) has been shown to resemble FIG. 5. The signal w(m) can be related to the original signal, magnitude between each of the original pairs of samples. The resultant signal, w(m) has been shown to resemble FIG. 5. The signal w(m) can be related to the original signal, x(m), as follows:

$$w(m) = \begin{cases} x(m/L) & m = 0, \pm L, \pm 2L, \ldots \\ 0 & \text{otherwise} \end{cases} \qquad (2)$$

Taking the Z transform of w(m).

$$W(Z) = \sum_{m=-\infty}^{\infty} w(m) Z^m \qquad (3)$$
$$= \sum_{m=-\infty}^{\infty} x(m/L) Z^m$$
$$= \sum_{n=-\infty}^{\infty} x(n) Z^{nL}$$

which implies
$$W(Z) = X(Z^L) \qquad (4)$$

Now, evaluating W(Z) on the unit circle, $Z = e^{jwT'}$ results in the Discrete Fourier Transform (DFT) of w(m).

$$W(e^{jwT'}) = X(e^{jwT'L}) = X(e^{jwT}) \qquad (5)$$

The function $W(e^{jwT'})$ is periodic or "wrapped" in the frequency domain with period $2\pi/T = 2\pi/LT'$, rather than $2\pi/T'$ as is the case for sequences sampled at a period T'. Thus, this operation has not changed the frequency content of the signal, only the period of wrapping in the frequency domain.

Figure 7:
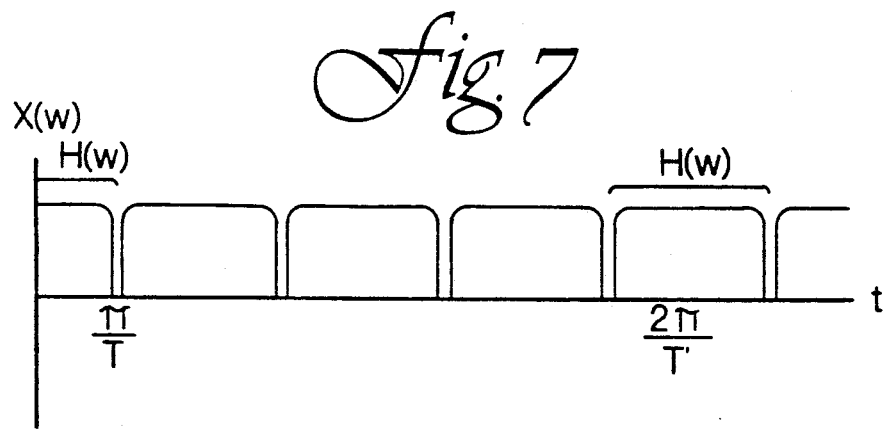
FIG. 7 is a frequency domain representation of an ideal low pass filter used to extract the baseband signal during the digital-to-analog conversion.

It is now necessary to eliminate the spectral energy associated with the undesired original harmonic components. This is accomplished by the special filter, h(n) shown in FIG. 6. Theoretically, this filter would be an ideal lowpass filter with cutoff at $2\pi/T$ and period T' as shown in FIG. 7.

Following an ideal low pass filtering of the sampled signal as shown in FIG. 5 with zero magnitude samples added, the frequency domain signal of FIG. 4b would be obtained. This signal is exactly the signal obtained if the original analog waveform had been sampled at the higher rate, T'. Thus, the system of FIG. 6 effectively increases the sampling rate by a factor of L.

There is, unfortunately, one problem with this approach. The impulse response of an ideal low pass filter is of infinite duration and is, therefore, impractical for Finite Impulse Response (FIR) implementation. Various sophisticated FIR design procedures have been employed in the implementation of filters for digital audio playback devices that have attempted sampling rate increases, but as noted earlier, these systems have failed to achieve acceptance by critical listeners. One significant problem in the designation of these filters is the arbitrary nature of choosing the appropriate frequency domain parameters. For example, with a given FIR filter order (typically 100 taps), passband, transition band, and stopband characteristics must be weighed in the specification of the filter. Without knowing reliable, acceptable figures for these parameters, the designer is effectively guessing at the appropriate values. Only through great luck could the optimal filter be designed under these conditions. The present invention overcomes these deficiencies in the prior art by designing the interpolation filter in the time domain where the elusive optimal frequency domain filter parameters are not required. The interpolating filter primarily fulfills a curve fitting function rather than a frequency domain filtering operation and the paramount concern should be the error in the interpolated data. Traditional frequency domain filter design does not satisfactorily treat this concern. A time domain design procedure for designing the interpolation filter in accordance with the present invention will perform the smoothing of the h(n) in the system shown in FIG. 6.

Time Domain Interpolation

In the preferred embodiment of the present invention, the interpolation of the sampled digital audio signal is performed as a time domain interpolation that involves the generation of a polynomial equation of degree $Q-1$ that passes through $Q$ original sample points along the magnitude curve of the signal as represented in the time domain. In essence, the signal processing means 10 computes a running set of parameters that fit a curve to the contour of $Q$ original samples, somewhat like pushing a french curve along the sample points and determining the best fit curve for the next set of sample points and then drawing in that curve by filling in the desired number of new samples between each of the original sample points.

There exist a number of useful interpolation algorithms that may be used in the numerical analysis required to perform the time domain interpolation of the present invention. Many of these algorithms are of an iterative nature and are relatively wasteful of valuable processing time when implemented in real time systems. Thus, only non-iterative interpolation schemes will be considered. One of the most versatile and accurate of these is Lagrangian Interpolation. Another preferred interpolation scheme is the C-Spline Interpolation.

Lagrangian Interpolation involves the generation of a polynomial of degree $Q-1$ which passes through $Q$ original samples. It can be shown that only even values of $Q$ will provide linear phase filters, as only even-valued $Q$ polynomials can be symmetric. The following expression generates Lagrangian polynomials for even-valued $Q$.

$$y(m) = \sum_{k=-(Q-2)/2}^{Q/2} \Phi_k^Q (m/L) x(k) \quad (6)$$

where, $$\Phi_k^Q(\beta) = \quad (7)$$

$$\frac{(-1)^{k+Q/2}}{\left\{\frac{(Q-2)}{2}+k\right\}! \left(\frac{Q}{2}-k\right)!(\beta-k)} \cdot \prod_{i=1}^{Q} (\beta + Q - i)$$

As shown in FIG. 6, the output $y(m)$ is simply the convolution of $w(m)$ with the interpolating filter, $h(m)$. This can be expressed as, $$y(m) = \sum_{k=m-(N-1)/2}^{m+(N-1)/2} w(k)h(m-K) \quad (8)$$

Substituting for $w(m)$ yields, $$y(m) = \sum_{k=m-(N-1)/2}^{m+(N-1)/2} x(k/L)h(m-k) \quad (9)$$

or, $$y(m) = \sum_{k=m-(N-1)/2}^{m+(N-1)/2} x(k)h(m-kL)$$

Comparing (9) with the Lagrangian interpolation equation (6), $$h(m - kL) = \sum_{k=-(Q-2)/2}^{Q/2} \Phi_k^Q(m/L) \quad (10)$$

Thus, the coefficients of the equation for $h(m)$ representing the interpolating filter in FIG. 6 can be derived. It will be seen that the values of the coefficients generated by equation (10) will change depending upon the resolution and smoothing desired, and on the format that the digitized audio signals are stored in. It is also instructive to note that the number of coefficients necessary for a given order $Q-1$ and sampling rate increase $L$ is equal to, $$N = Q^*L \quad (11)$$

Figure 8:
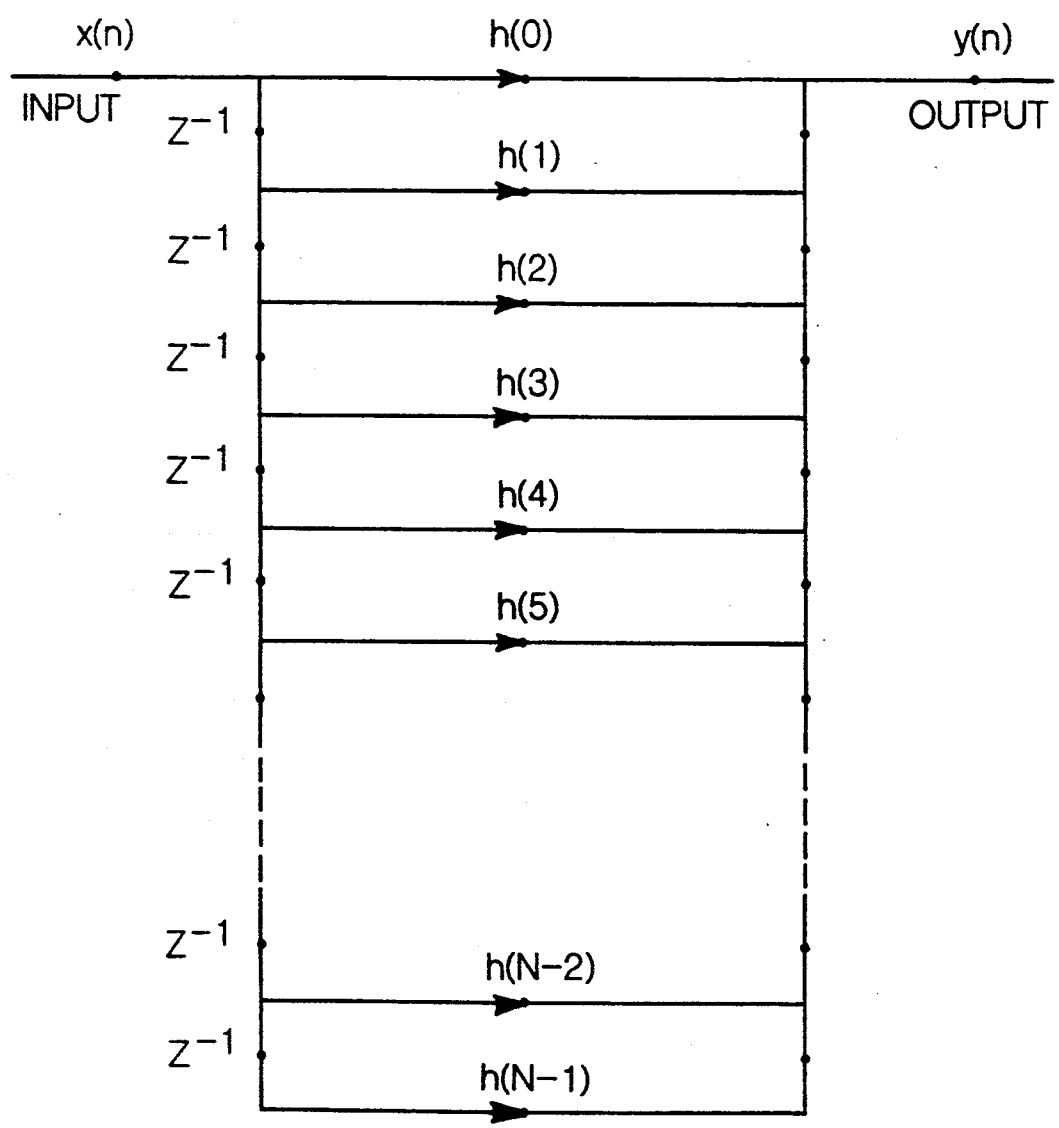
FIG. 8 is a signal flow graph of an interpolation system utilizing a time domain interpolation process in accordance with the present invention.

This result is obvious, because $Q$ samples of the original waveform are simultaneously weighted by the interpolating filter to achieve $Q-1$ order polynomial interpolation. Because $L-1$ zero magnitude samples are inserted between each original sample pair, $Q^*L$ coefficients are needed to carry out the filtering operation. A signal flow graph of the basic interpolation system for such a time domain interpolation system is shown in FIG. 8. Such a network is equivalent to a traditional FIR filter design. Thus, using the present invention, the Lagrangian time domain interpolation can be implemented as an FIR topology.

In the preferred embodiment, the time domain interpolation is calculated for a 11th order ($Q-1$) polynomial to fit the contour of twelve ($Q$) original samples at a time by generating 15 new samples between each of the original twelve samples. The computation for the Lagrangian polynomial of the 11th order to fill in 15 interpolated samples between each original sample is based on a formula in the form of:

$$\text{Output}(0) = x(191)^*c(0) + x(190)^*c(1) + \ldots + x(0)^*c(191) \quad (12)$$
$$\text{Output}(1) = x(192)^*c(0) + x(191)^*c(1) + \ldots + x(1)^*c(191)$$

$$\text{Output}(15) = x(206)^*c(0) + x(205)^*c(1) + \ldots + x(15)^*c(191)$$

where $x(n)$ = input sample values and $c(n)$ = the coefficients for the polynomial as calculated above. There are 192 coefficients in equation (12) because there are 192 variables being computed (12*16). However, because only every 16th variable is non-trivial (i.e., non-zero), equation (12) may be shortened by eliminating the 15 intermediate coefficients where $x(n)=0$. Consequently, the output equations may be shortened to:

$$\text{Output}(0) = x(191)^*c(0) + x(175)^*c(16) + \ldots + x(15)^*c(175) \quad (13)$$
$$\text{Output}(1) = x(191)^*c(1) + x(175)^*c(17) + \ldots + x(15)^*c(176)$$

$$\text{Output}(15) = x(191)^*c(15) + x(175)^*c(31) + \ldots + x(15)^*c(191)$$

Of course, the values for Output(0), Output(16), etc. are a trivial calculation in the interpolation process because the actual data values for those samples are used and the coefficient is one. By determining the coefficients for the polynomial of equation (13), the signal processing means 10 of the present invention is able to perform a time domain interpolation of that segment of the audio signal that can achieve the oversampling rates necessary to enable the high-quality reproduction of musical sound in a professional or high-end digital audio system.

Implementing Time Domain Interpolation

To solve the problems inherent in the prior art frequency domain oversampling techniques and implement the type of time domain interpolation described above, the present invention utilizes a unique approach to the design and implementation of the audio signal reconstruction process. This approach emphasizes certain design constraints that are different from the prior art digital audio systems. Most importantly, the present invention is designed to eliminate the energy in the region of the frequency domain that experiences any non-linearity in the reproduction of the music material.

Figure 9A:
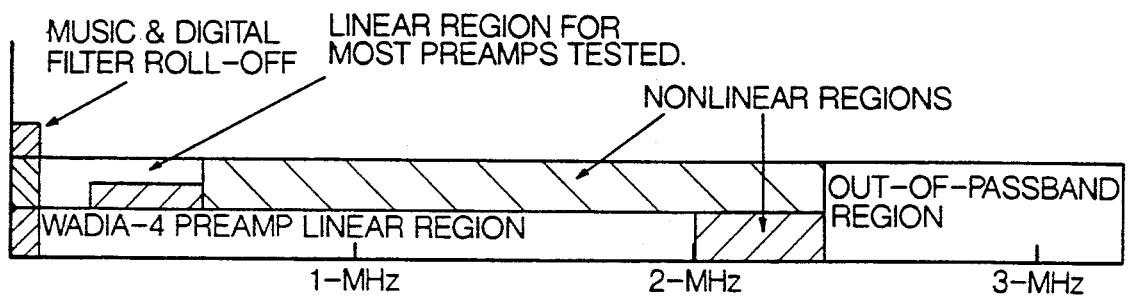
FIGS. 9a, 9b and 9c are frequency domain representations of the linear and non-linear regions of preamplifiers showing the location of the noisebands for various oversampling rates.
Figure 9B:
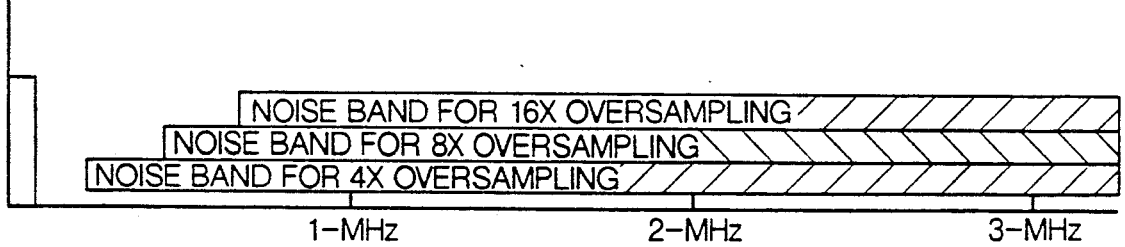

As shown in FIG. 9a, energy in the non-linear range of an audio reproduction system is susceptible to induced beating or harmonic distortion and may be folded back into the passband, thereby creating a veiled sound to the reproduced music. Suppression of as much of the out of passband energy as possible is desired to minimize the possibility of these effects. However, this suppression or filtering of out of passband energy should in no way alter the baseband (20 KHz) that carries the music material. As shown in FIG. 9b, shifting the noise band by conventional oversampling techniques does not achieve the desired results because the noiseband may still remain in the non-linear range of the preamplifier. Even 16X oversampling does not shift the noiseband far enough into the out-of-passband region to insure that these effects will not be reproduced.

Figure 9C:
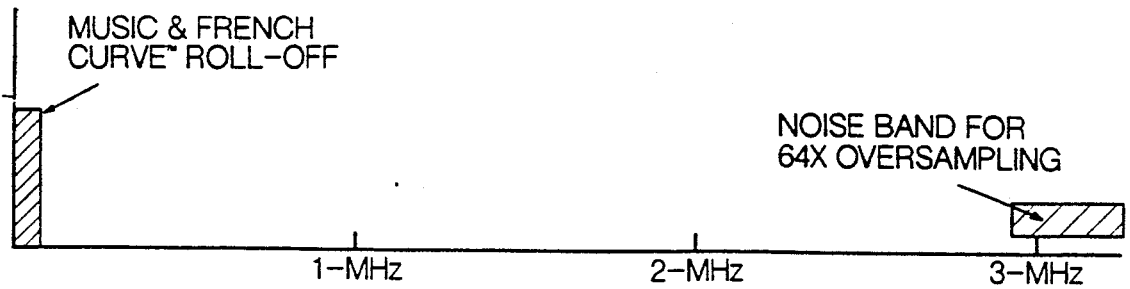

A goal of the present invention is to achieve an oversampling rate that will shift the noiseband out of the non-linear region of the digital audio system. Consequently, the oversampling rate achieved by the time domain interpolation of the present invention must be sufficient to shift the noiseband above the non-linear range of the preamplifier. The oversampling rate necessary to shift the noise band into the out-of-passband region will depend upon the quality of the amplifier or preamplifier used in the digital audio system. Typically, the out-of-passband region for most preamplifiers start at 2 MHz. With the 64X oversampling technique of the present invention, as shown in FIG. 9c, the oversampling noiseband is shifted well above 2 MHz and into the out-of-passband region of all preamplifiers, thereby preventing the fold-back effect experienced in current oversampling systems.

Another goal of the present invention is to guarantee optimal transient response. Traditional frequency domain oversampling cannot incorporate time-domain transient parameters into its design. The response of a time domain oversampling system, however, can be constrained to pass all original sample points guaranteeing that no significant overshoot or widening of transients will occur.

Because of the time constraints involved in performing the necessary calculations to achieve the desired 64X oversampling (up to 48,000 original data samples per second for the R-DAT Format), the preferred embodiment of the present invention utilizes several novel techniques to obtain an effective processing rate of 72 million calculations per second. First, each of the digital signal processors, DSP-0 and DSP-1, contains an arithmetic unit with a 16 bit X 16 bit parallel multiplier that generates a full 32 bit product in 55 ns. The product can be accumulated with one of two 36 bit accumulators.

Each DSP operates at a clock frequency of 36 MHz. Consequently, the present invention utilizes a parallel pipeline architecture on each channel to operate two DSPs, DSP-0 and DSP-1, in parallel to achieve the required 72 MIPS processor speed. In the preferred embodiment, the pair of DSPs operate in tandem with DSP-0 used to calculate the even sample values and DSP-1 used to calculate the odd sample values, thereby effectively doubling the amount of time available for each processor to complete the necessary calculations before moving to the next value.

Figure 10A:
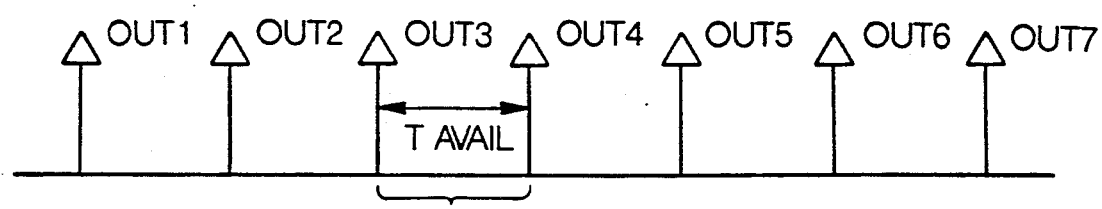
FIGS. 10a, 10b and 10c are a time chart representation of the time available for the time domain interpolation process utilized in the present invention.
Figure 10B:
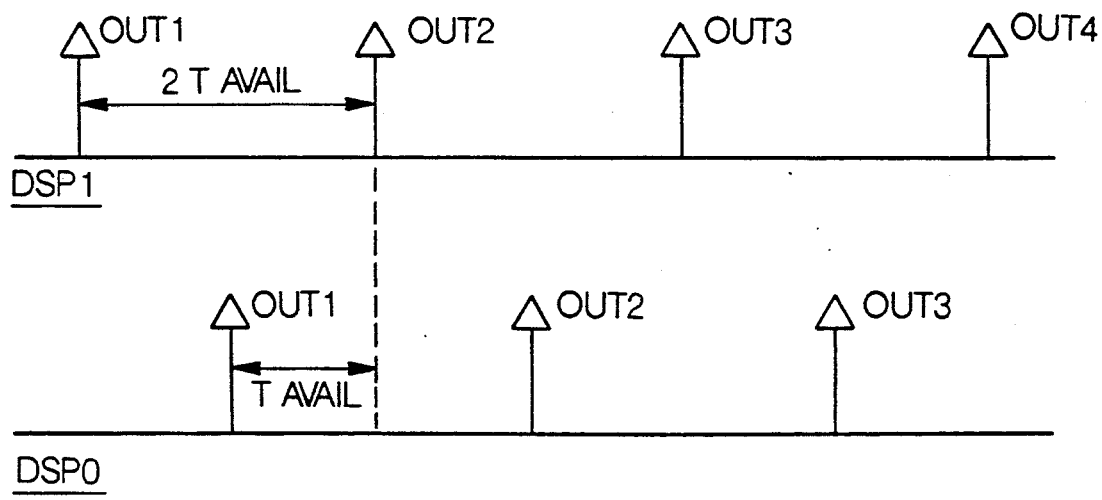
Figure 10C:
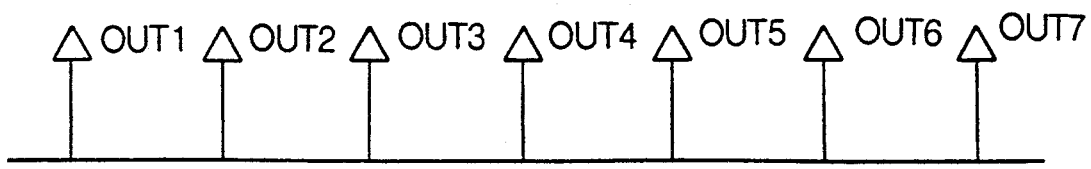

Referring now to FIGS. 10a through 10c, the parallel pipeline structure of the two DSPs, DSP-0 and DSP-1 will be explained. As shown in FIG. 10a, the time available to compute each output for the Interpolated Data output is $T_{avail}$. In this case, because the processor clock speed of the DSP is only 36 MHz, the calculation of the coefficients for the desired equation cannot be completed in $T_{avail}$. If however, the calculations were performed for every other output, then, as shown in FIG. 10b, the effective $T_{avail}$ is doubled. By splitting the calculations for the even and odd Interpolated Data outputs between the two DSP's, the present invention achieves both the speed and the precision necessary to perform the required calculations and drive the high length filter that comprises the digital conversion means 30 and 32. Each DSP is loaded with the identical interpolation program, with the calculations for the relevant coefficients for the even and odd outputs split between the two DSP's such that DSP-0 calculates the even indexed coefficients and DSP-1 calculates the odd-indexed coefficients. When the outputs of the two DSPs are then summed together, as shown in FIG. 10c, the result is a time domain interpolation that can produce the interpolated samples at twice the rate of a single DSP. It will be apparent that this method of interleaving the DSP's to calculate the outputs for each new set of samples could be extended to more than just a pair of DSP's operating in tandem. In general, a time domain interpolation simulating an FIR filter of any length could be implemented by this technique. If the desired FIR filter was of length N, and a single DSP could compute M terms between input samples, then N/M DSPs would be required in the parallel method described.

Figure 11A:
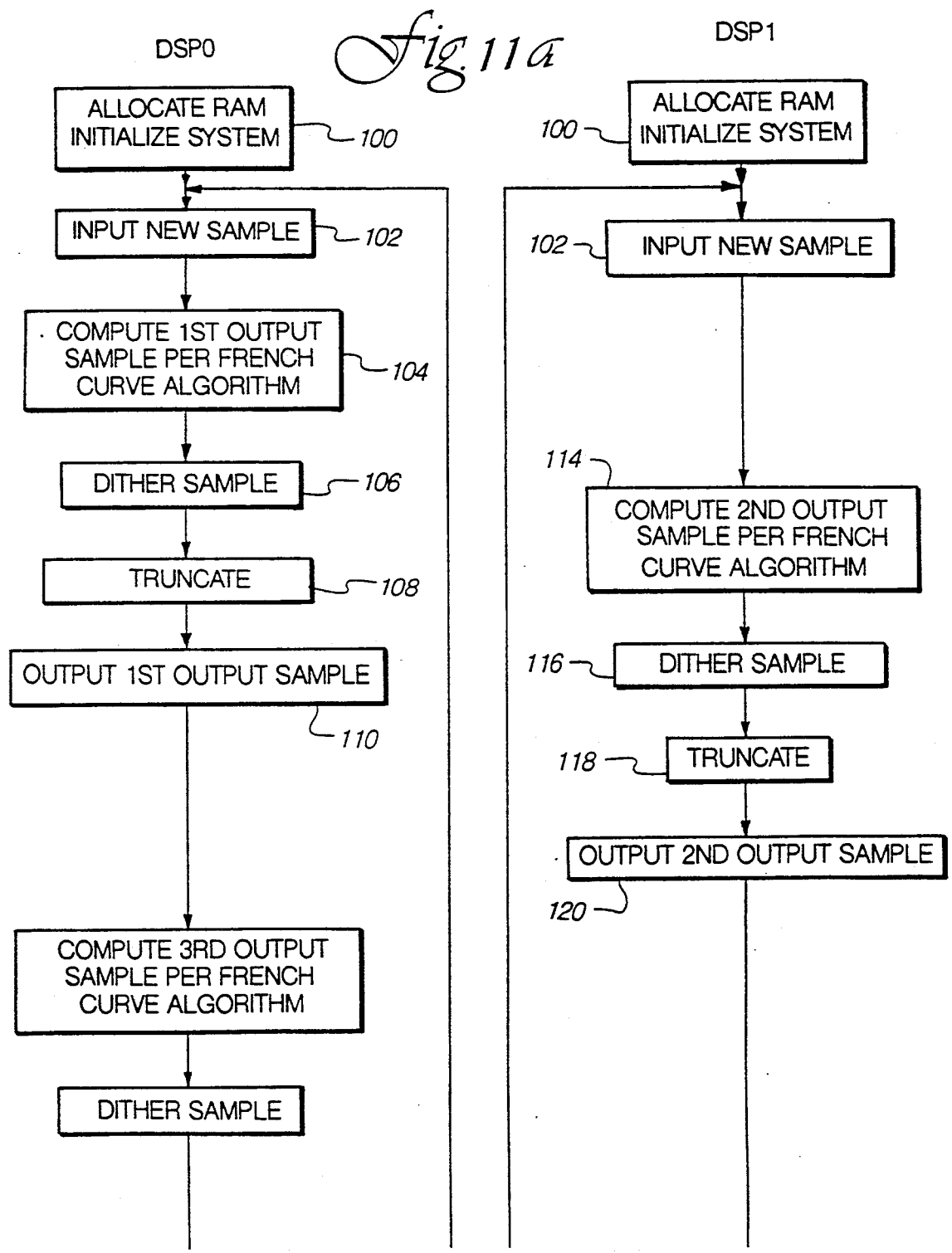
FIGS. 11a and 11b is a flow chart showing the program flow for a pair of digital signal processors performing the time domain interpolation in accordance with the present invention for a single channel.
Figure 11B:
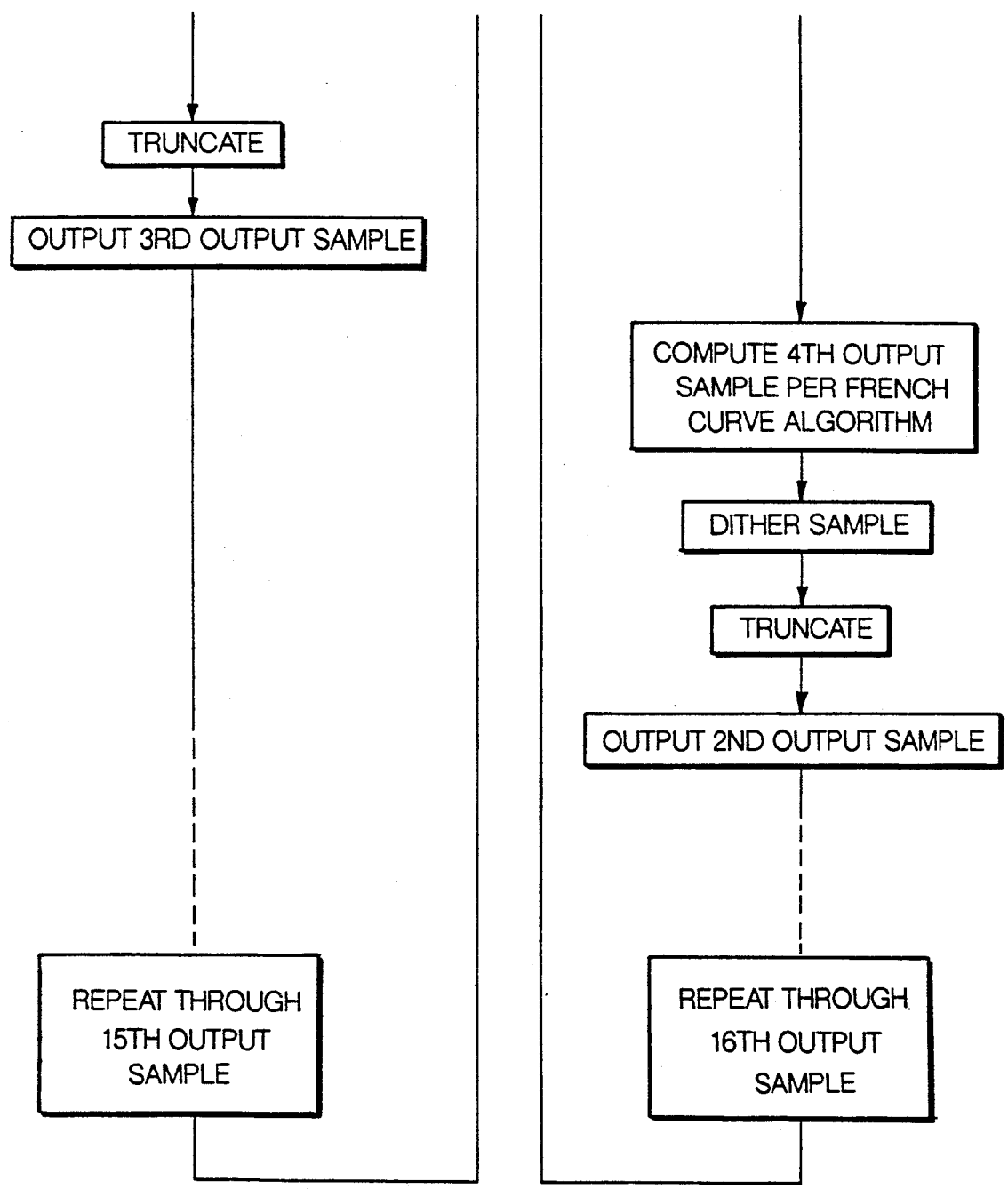

Referring now to FIG. 11, a simplified flow chart for the software for each DSP, DSP-0 and DSP-1, is shown. The software is written for the the AT&T WE DSP16 digital signal processor described above. At Initialize 100, each DSP is initialized and memory is allocated for the working variables used by the processors. The program will assume zero values for the first twelve (Q) samples so that the samples at the beginning of the segment of digitized music material can also be interpolated using the same procedures as the remaining samples. In the preferred embodiment, a pointer is set to a circular buffer containing the predetermined values for the particular coefficients of equation (13) that will be used in performing the interpolation. In this manner, it is a simple matter to select a different interpolation algorithm merely by changing the values for the coefficients in the buffer. At Input 102, a new sample value is input into the range of Q samples for which the interpolation will be performed. At Compute 104, DSP 0 computes the values for the first interpolated sample output in accordance with the predetermined coefficients pointed to by the pointer for DSP 0. The multiply calculations are performed with 16-bit numbers, yielding a 32-bit result. The accumulate calculations are performed on the 32-bit result, yielding a 36-bit precision value. At Dither 106, one-half of the least-significant-bit (LSB) of a pseudo-random noise value is added to the LSB for each calculation. In essence, the dithering process takes the place of a normal rounding processing during the calculation, but produces a statistically better time average for estimating the interpolated value of the signal. At Truncate 108, the final value of the first interpolated sample of the Interpolated Data output is truncated to 16 bits to be transferred to the DAC 30 or 32. At Output 110, the first interpolated sample output is transferred to the DAC 30 or 32 for performing the digital-to-analog conversion.

At Compute 114, DSP 1 computes the values for the second interpolated sample output in accordance with the predetermined coefficients pointed to by the pointer for DSP 1. The second interpolated sample is dithered at Dither 116 and Truncated at Truncate 118 to be output at Output 120 as the final value of the second interpolated sample of the Interpolated Data output. Because of the parallel pipeline structure described above, DSP 1 has an adequate amount of time in which to perform the necessary calculations. This process is repeated until all sixteen interpolated sample outputs have been generated, with each of the DSPs having sufficient time to perform the calculations necessary to achieve an effective 16X oversampling rate. The Interpolated Data output by the pair of DSPs, DSP-0 and DSP-1, for each channel implements the 192 tap Finite Impulse Response (FIR) structure in accordance with equation (13).

Figure 12:
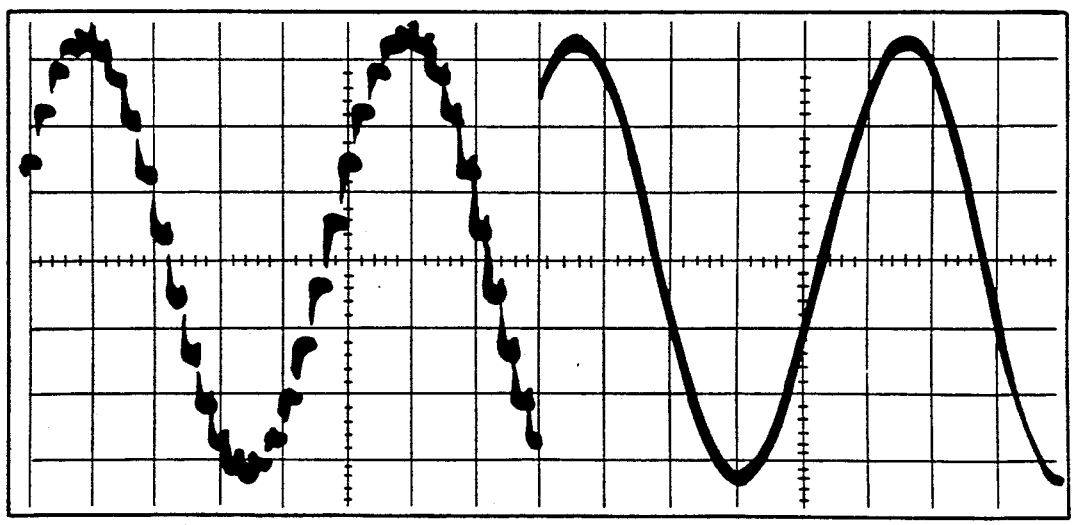
FIG. 12 is a representation of an oscilloscope trace showing two traces for the reproduction of an 8 KHz sine wave by a 4X oversampling frequency domain smoothing system (left trace) versus the 64X oversampling time domain interpolation of the present invention (right trace).

The results of the present invention are most convincingly demonstrated in the oscilloscope trace comparisons of digital audio signals that have been reconstructed using the prior art signal processing means and using the signal processing means of the present invention. FIG. 12 shows two traces for the reproduction of an 8 KHz sine wave. The left trace is the DAC output of a 4X oversampled CD player that utilizes the frequency domain oversampling techniques known in the prior art. It can be seen that there are 22 steps per cycle, representing the number of times that the frequency of the signal (8 KHz) goes into the 4X oversampling rate (176 KHz). The right trace is an output of a signal processing means in accordance with the present invention utilizing 64X oversampling. The smoothness of the trace is due to the fact that there are 353 steps per cycle for this 8 KHz signal.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A signal processor apparatus for performing time domain interpolation of a digitized audio signal, the signal processor apparatus comprising:
   receiving means for receiving the digitized audio signal comprised of a plurality of digital samples representing an analog audio signal sampled at a defined sampling rate to produce a received signal;
   decoding means for demodulating the received signal to produce a decoded signal;
   processing means for performing a time domain interpolation on the decoded signal to produce an interpolated data signal having an increased sampling rate over the defined sampling rate of the digitized audio signal; and
   means for converting the interpolated data signal into an analog output signal to be transmitted to an amplifier for output through a speaker.

2. The signal processor apparatus of claim 1 wherein the digitized audio signal represents musical information as stereophonic digitized audio signals having a left channel signal and a right channel signal and the processing means is comprised of two parallel digital signal processing means, one digital signal processing means for processing the left channel signal and one digital signal processing means for processing the right channel signal.

3. The signal processor apparatus of claim 2 wherein the digital signal processing means are each comprised of a pair of interleaved digital signal processors, a first digital signal processor for computing a set of even sample values of a time domain interpolation equation and a second digital signal processor for computing a set of odd sample values of the time domain interpolation equation.

4. The signal processor apparatus of claim 3 wherein the time domain interpolation equation is a non-iterative polynomial of $(Q-1)$ degree, where Q is the number of consecutive original digitized samples used in the interpolation.

5. The signal processor apparatus of claim 4 wherein the time domain interpolation equation is a Lagrangian interpolation.

6. The signal processor apparatus of claim 4 wherein the time domain interpolation equation is a combination spline interpolation.

7. The signal processor apparatus of claim 4 wherein (Q) the number of consecutive original digitized samples is twelve.

8. The signal processor apparatus of claim 4 wherein the number of interpolated data signals generated for each pair of consecutive original digitized samples used in the interpolation is fifteen.

9. A signal processor apparatus for reconstructing a digitized audio signal, the signal processor apparatus comprising:
   receiving means for receiving the digitized audio signal comprised of a plurality of original digital samples representing an analog audio signal sampled at a defined sampling rate and ordered in a time sequence and divided into a left channel signal and a right channel signal to produce a received signal and synchronizing the received signal with an internal clock signal to produce a synchronized signal;
   decoding means for demodulating the synchronized signal and extracting from the synchronized signal a timing signal and an original data signal representing the original digital samples for the corresponding left and right channel signal;
   left and right processing means for performing a time domain interpolation on a number (Q) of consecutive elements of the original data signal for the corresponding channel signal to produce an interpolated data signal for the corresponding channel signal having an increased sampling rate over the defined sampling rate of the corresponding digitized audio signal; and
   left and right converting means for converting the interpolated data signal for the corresponding channel signal into an analog output signal to be transmitted to an amplifier for output through a speaker.

10. The signal processor apparatus of claim 9 wherein the receiving means includes a phase lock loop for synchronizing the received signal with the internal clock signal.

11. The signal processor apparatus of claim 9 wherein the time domain interpolation is the non-iterative solution of a polynomial of $(Q-1)$ degree.

12. The signal processor apparatus of claim 11 wherein the time domain interpolation equation is a Lagrangian interpolation.

13. The signal processor apparatus of claim 11 wherein the time domain interpolation equation is a combination spline interpolation.

14. The signal processor apparatus of claim 11 wherein (Q) the number of consecutive elements of the original data signal used in the interpolation is twelve.

15. The signal processor apparatus of claim 11 wherein the number of interpolated data signals generated for each pair of consecutive elements of the original data signal used in the interpolation is fifteen.

16. The signal processor apparatus of claim 9 wherein the left and right converting means are each comprised of a plurality of transversal, summed-multiport analog delay line digital-to-analog converters.

17. The signal processor apparatus of claim 16 wherein the digital-to-analog converters are arranged such that each converter is delayed by a time period in proportion to the total number of converters in the converting means.

18. The signal processor apparatus of claim 17 wherein there are four digital-to-analog converters, each converter being delayed by ¼th the time period from a previous converter, whereby each of the left and right converting means simulates an analog linear interpolation filter providing four times the oversampling of the interpolated data signal.

19. The signal processor apparatus of claim 9 further comprising channel latching means for receiving the interpolated data signal and the timing signal from both the left channel and the right channel and generating a synchronizing data signal to align the interpolated data signal for both channels.

20. The signal processor apparatus of claim 19 further comprising a pair of interfacing means for receiving the interpolated data signals, timing signals and synchronizing signal and isolating the processing means from the left and right converting means.

21. A method of reconstructing a digitized audio signal using a digital signal processor and a digital-to-analog converter, the method comprising the steps of:
receiving the digitized audio signal comprised a plurality of original digital samples representing an analog audio signal sampled at a defined sampling rate and ordered in time sequence;
for a number (Q) of consecutive original digital samples, calculating in the time domain more than one interpolated sample between consecutive pairs of original digital samples based on the original digital samples using the digital signal processor to perform a non-iterative interpolation in the form of a polynomial of $(Q-1)$ degree; and
converting both the original digital samples and the interpolated samples to an analog audio signal using the digital-to-analog converter.

22. The method of claim 21 wherein the non-iterative interpolation is a Lagrangian interpolation.

23. The method of claim 21 wherein the non-iterative interpolation is a Combination-Spline interpolation.

24. The method of claim 21 wherein the number (Q) of consecutive original digital samples is twelve.

25. The method of claim 21 wherein the number of interpolated samples between consecutive pairs of original digital samples is fifteen.

26. The method of claim 21 wherein the step of converting both the original digital samples and the interpolated samples to an analog audio signal further comprises the step of delaying the interpolated samples to produce a delayed sample and converting the delayed samples to an audio signal at a plurality of defined intervals in the delay to produce a converted sample and then summing the results of the converted delayed signals together to further increase the oversampling rate of the original digital samples.

27. The method of claim 26 wherein the interpolated samples are delayed and converted by using four digital-to-analog converters staggered over equal intervals of the delay.

* * * * *